United States Patent [19]

Zerowin

[11] Patent Number: 4,639,583
[45] Date of Patent: Jan. 27, 1987

[54] DATA TERMINAL SYSTEM

[76] Inventor: Jeffrey H. Zerowin, 3 Franciscan Way, Fairlawn, N.J. 07410

[21] Appl. No.: 711,952

[22] Filed: Mar. 14, 1985

[51] Int. Cl.$^4$ .............................................. G06K 5/00
[52] U.S. Cl. .................................................... 235/380
[58] Field of Search .............................. 235/380, 381

[56] References Cited

U.S. PATENT DOCUMENTS 4,458,300  11/1984  Peirce .................................. 235/380

*Primary Examiner*—Harold I. Pitts
*Attorney, Agent, or Firm*—McAulay, Fields, Fisher, Goldstein & Nissen

[57] ABSTRACT

An identification system is disclosed in which a stand-along data terminal reads identification data from an identification card presented at the terminal. The terminal also reads real-time data at the time of each such card presentation. A removable cassette, when plugged into the terminal, records the identification data and the real-time data which is generated by the terminal. The cassette is removed from the terminal so that the recorder data information can be carried and transported to a central data processing unit, whenever desired, for delayed time processing of the data.

18 Claims, 3 Drawing Figures

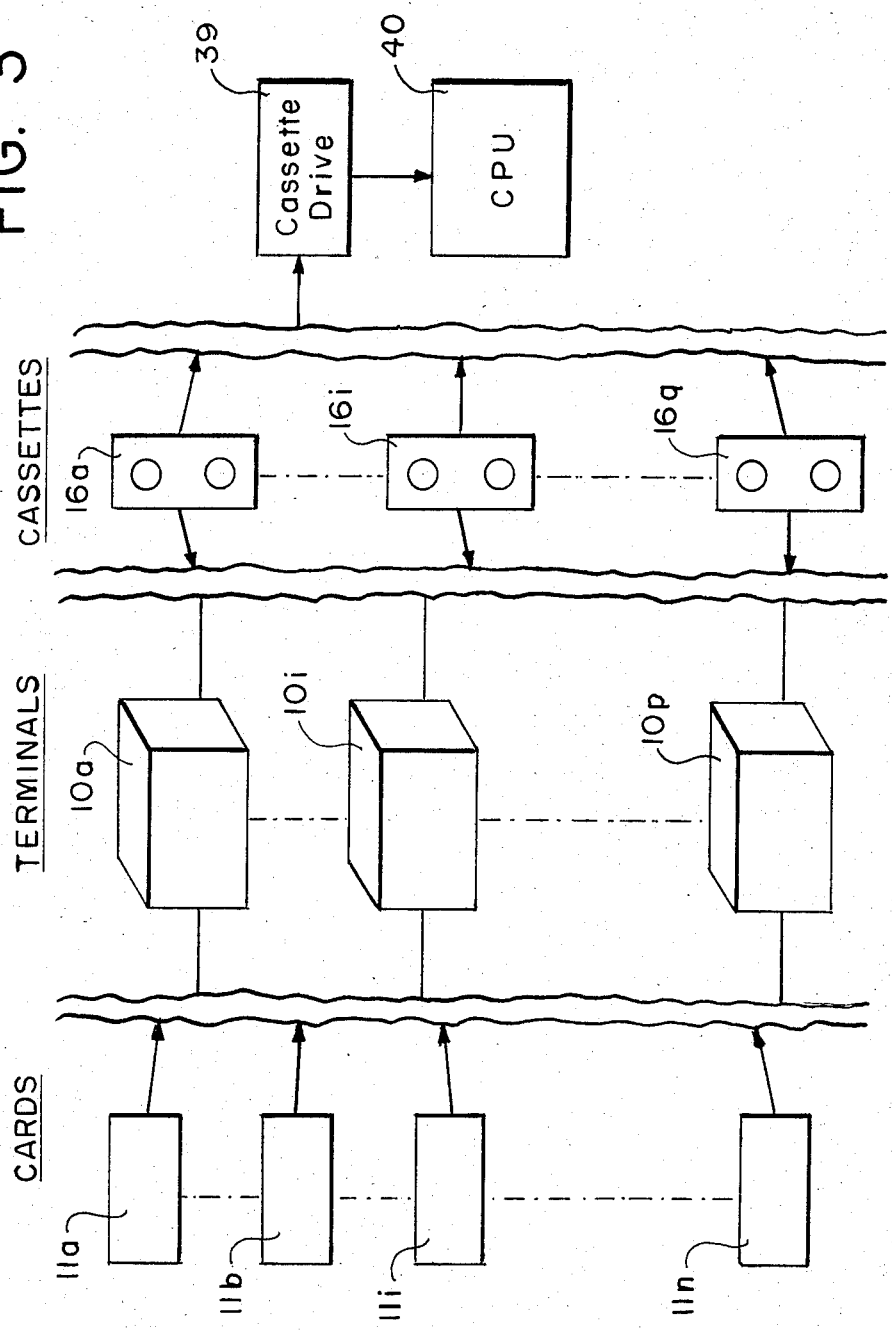

DATA TERMINAL SYSTEM

BACKGROUND OF THE INVENTION

This invention relates, in general, to a data terminal system in which each terminal has a stand-alone characteristic so that the system arrangement is not dependent on the proper functioning of each terminal, or on the interconnection between terminals.

Personnel access procedures in schools, hospitals and other institutions range from the seemingly simple sign in procedure, with or without a security guard, to complex recognition systems employing computer recognition of an access card, a fingerprint and/or signature. All of these techniques have an appropriate plate as a function of security requirements, risks that may be undertaken and cost considerations.

There are circumstances, such as in a school with multiple classrooms, where individual students may have to check in at many different places, at the school entrance and at various classrooms during the course of the day. With a number of terminals (one per classroom, for example) and a large number of students, processing capacity requirements are compounded by substantial simultaneous usage as at the beginning of each class. The cost of controlling a large number of terminals simultaneously is prohibitive because of the processing capacity required.

At the same time, it is important in such situations that the entry data be readily processed to provide fairly immediate access to the information for the purpose of determining attendance or absence.

At the present state of the art, the cost, complexity and risk of malfunction when interconnecting a large number of terminals in many different rooms in institutions such as schools and hospitals is unacceptable. The data flow through rate is severely limited by the number of terminals per interface board and by the number of slots in the processor to handle the boards.

Accordingly, it is a major purpose of this invention to provide an access control and access information system involving a multi-terminal arrangement in which an optimum trade-off is made between costs, complexity and utility, in which there is a minimum of maintenance required and in which the capability exists to obtain current information when and as required.

It is a related purpose of this invention to provide the above system parameters is a system that has substantial security and provides a minimum opportunity for tampering or compromising.

BRIEF DESCRIPTION

In brief, one embodiment of this invention is a combination of (a) a number of stand-alone data terminals with each data terminal having a cassette recorder, (b) a plurality of machine readable identification cards, each card unique to and carried by each individual who is to be identified by the system, and (c) a plurality of removable cassettes. The stand-alone data terminal, although it requires a source of power, is not otherwise wired, coupled or connected to any other data terminal or to a central data processing unit. Each of the plurality of identification cards is carried and maintained by a separate individual who is to be identified or tracked by the system. The removable cassettes, when inserted into the recorder component of the terminal, will receive whatever data is read from each indentification card and will correlate data, such as the time of entry, which is generated by the stand-alone terminal. This removable cassette is inserted and removed by the party in charge, such as a teacher, at the beginning and end of each class period. Thus, the data information can be securely carried around and also can be transported to a central data processing unit whenever desired to be processed there.

Thus, in the school context, for example, by having a cassette or other readable media, removable so that it travels with the teacher, and by having each individual student identification card travel with an individual student, an optimum attendance matching arrangement can be provided which can readily be checked out to provide an updated attendance list at almost any time by taking the cassette to a central station.

THE FIGURES

FIG. 3 is a schematic representation of the system of this invention showing the mechanical and electrical isolation between the data terminals and central processing unit.

DESCRIPTION OF THE PREFERRED EMBODIMENT

Although other uses for the system of this invention may be contemplated, it will make it convenient to disclose the embodiment of this invention that has been adapted for use in a school.

Figure 1:
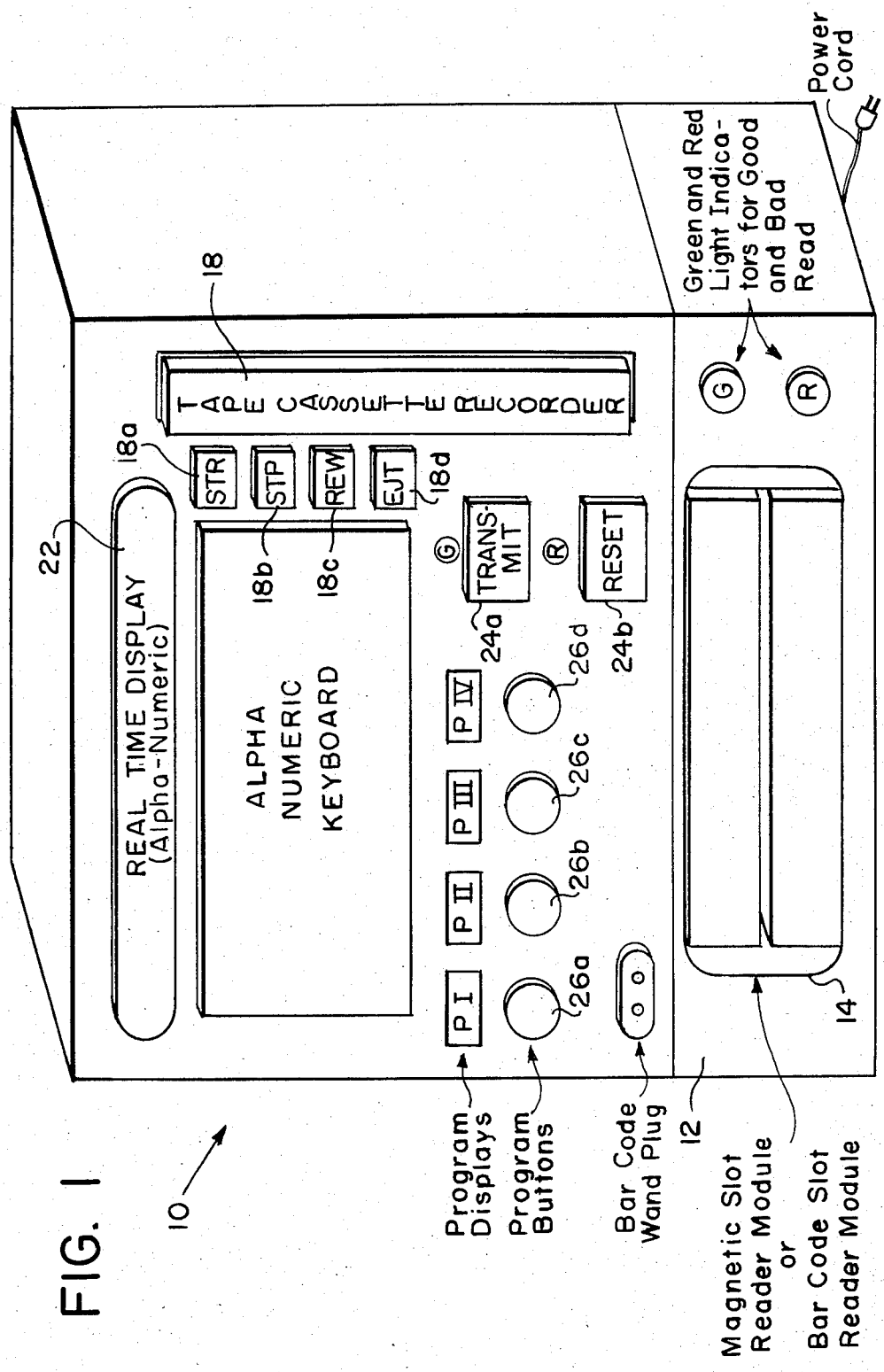
FIG. 1 is a view of the face of a stand-alone data terminal representative of an embodiment of this invention.

The FIGS. illustrate one embodiment of this invention which is particularly adapted for use in a school having a large number of students and a large number of classrooms where the students go from classroom to classroom as they change classes. In the system, each stand-alone terminal 10 has a front panel 12, as shown in FIG. 1, that provides a number of possible inputs and functions which can be best understood in connection with the description of the block diagram of FIG. 2. It should be initially noted that the terminal 10 has a reading unit 14 which, for example, can be a magnetic strip reading unit through which a student passes the magnetic striped portion of his or her card thereby effecting a check-in reading of the student involved. This information is read in onto a movable tape cassette 16 through a recorder 18 which presumably is under the control of the teacher in the classroom or security guard at the station. A clock 20 provides a real-time display 22 and this time parameter is fed onto the tape cassette 16 as the student swipes the access card through the reader 14. In this fashion, the student check-in is a time check-in.

Figure 2:
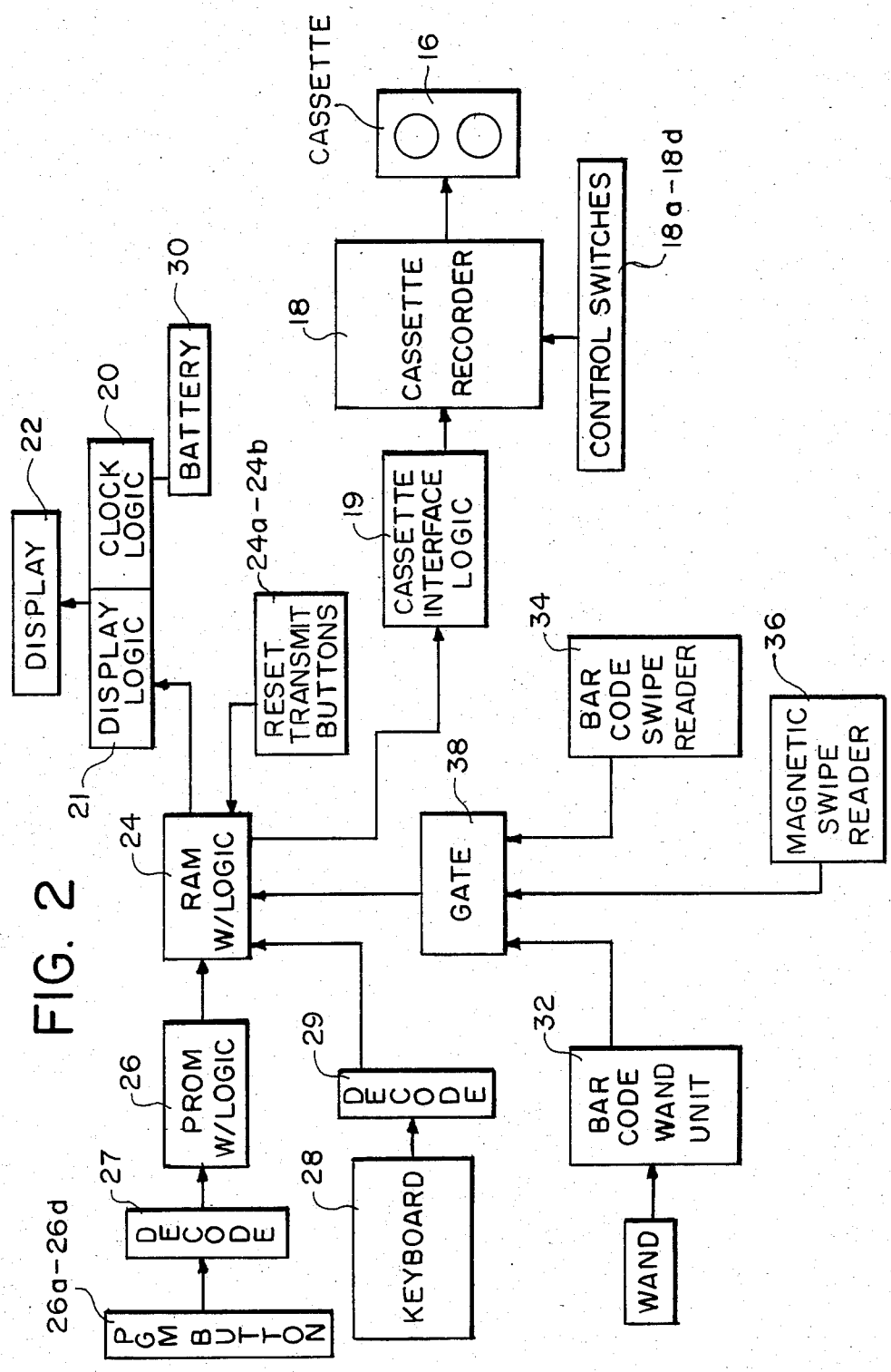
FIG. 2 is a block diagram of the contents of the stand-alone data terminal of FIG. 1 indicating three different input arrangements, any one or more of which could be employed.

As shown in FIG. 2, each terminal 10 contains a random access memory RAM unit 24 which is programmed to control various functions in the terminal by a prior programmed programmable read only memory PROM unit 26. The PROM 26 can be programmed to provide any number of program functions. In the embodiment shown, four program functions are presumed and thus the terminal 10 has four program buttons 26a through 26d to permit selection of the program desired.

The following are functions which the system of this invention makes readily available. One button 26a could serve to enable a program that permits clocking in and out during the classroom period and thus associates the time read on clock 20 with the identification information read from the identification card. A second program initiated by button 26b would permit clocking in only for a predetermined number of minutes after the program is actuated so that a student could check in automatically only at the beginning of the period. This second program would require that the clock still run continuously but provide an indication on the display 22 that the terminal 10 was disabled after the predetermined time period has passed. A third button 26c could enable or initiate a program relating to book distribution in which a bar code is read by the wand at the input unit 32 concurrently with reading a student's identification card. Both of those pieces of information would be placed on the cassette in conjunction with one another. A fourth button 26d could enable the keyboard 28 so that the teacher would be able to enter grades or any other information together with a student identification number.

The RAM 24 is reset and enabled by the usual reset 24b and transmit 24a buttons. Normally, after an entry is made on the boards, the transmit button 24a applies the data to the RAM 24.

Clock 20 is run off a DC battery 30 which provides an output which is placed on the cassette 16, under control of the RAM logic 24, each time an input card is read by the RAM 24. Preferably, this time value is also presented on display 22 so that the student checking in will have confirmation at the time he or she checks in.

The cassette recorder 18 is under the control of the usual control switches 18a through 18d to start and stop operation of the recorder, and also to provide for rewind and eject of the cassette 16.

FIG. 2 shows three different optional input arrangements, any one or more of which can be included. Thus, the known bar code wand unit 32 may be employed, or the bar code swipe reader unit 34 or the magnetic swipe reader unit 36 may be incorporated. Each of these are known reader units to provide known types of inputs to the RAM logic 24 for appropriate processing and recording on the cassette 16. In the simplest arrangement, that processing will normally be to associate the input data that is read with a real-time parameter.

Keyboard 28, with its interfacing or decoding unit 29, can be used to provide additional data which the RAM logic 24 processes for recording on the cassette 16.

The decode units 27 and 29 are essentially analog to digital converters. They provide appropriate coding from a substantially analog signal generated by a button or key to the digital input required for the PROM 26 or RAM 24 as the case may be. As it is preferred to use a simple standard cassette recorder device 18, an appropriate and known interface 19 is required between the RAM 24 output and recorder 18 to translate the digital output information signals from the RAM 24 into power control signals for the cassette recorder 18. The gate 38 primarily serves to isolate the input units 32, 34 and 36 from each other while providing coupling between which ever one of those units is employed to the input of the RAM 24. In a presently preferred embodiment, the input unit 32 would be connected simultaneously with either the unit 34 or the unit 36. However, any number of input units could be employed.

The contents of each data terminal 10 are quite simple and straightforward as indicated in FIG. 2. In particular, a programmable ROM 26 need be no more that a single 64K chip. A 64K RAM 24 should be all that is required to perform any of the functions described herein. At a central unit, a cassette drive 39 and a microprocessor 40 with RS232 interface should be all that is required.

With the above understanding of the stand-alone terminal 10 in mind, the operation of the entire system of this invention can be readily understood. With reference to FIG. 3, an indefinite number "n" of identification cards 11 (indicated as 11a through 11n) constitute a basic input to the system. Any one or more of the identification cards 11 can be used with any one or more of the stand-alone data terminals 10. Any number "p" of data terminals 10 may be employed in the system. Because they are not directly connected to the central processing unit CPU 40, there is no limitation of the number of these data terminals 10. Furthermore, any number "q" of cassettes 16 can be employed in the system. The cassettes 16 can be readily removed from the data terminal and thus can act as a store of data independent of one or more terminals 10. It is the cassettes 16 which are inserted at the central unit 39, 40 and thus can be processed in whatever queing routine is required by the capacity of the central processing unit 40.

In this fashion, real-time data is reported without any limitation by the capacity of the CPU 40 because the portable cassette 16 stands between the set of data terminals 10 and the CPU 40. Accordingly, a high capacity system can be obtained with a reasonable capacity CPU 40.

In addition, a great deal of security can be obtained because the only connection to the stand-alone data terminal 10 is a power lead plugged into the wall socket. Thus, any data terminal 10 can be unplugged at any time and put into a locked box for security purposes overnight or for any other time period desired.

This security feature highlights the importance of having a DC battery 30 run the clock 20. It is important that the clock run continuously even when the terminal 10 is disconnected from its power supply. Furthermore, the display logic 21 converts the clock or other binary data to a form appropriate for the display 22. The display 22 is on only when terminal 10 is plugged in. The battery 30 is not drained by the power requirements for the display 22. Thus, by use of a C-MOS clock 20, the battery 30 can last for well over a year. However, in keeping with the minimum maintenance characteristics of this system, it may be desirable that the battery 30 be rechargable.

Thus, by collecting data in real-time and taking each batch of data, such as all those students who have checked in for a class, for processing by a central processing unit 40 in other than real-time, a combination of real-time batch entry together with delayed time batch processing permits the use of relatively inexpensive equipment so that a stand-alone terminal can be available in each classroom in the school. By having the recording media readily insertable and removable, a reasonably high degree of accuracy and security is obtained.

By providing a readily removable readable data record, this system provides much of the flexibility that is available with a system where all the terminals are wired to a central processing unit. But by separating data entry from data processing, it becomes possible to have the capacity necessary to obtain real-time data entry without requiring a lot of data processing capacity which would be idle most of the time. It also becomes possible to provide a system that provides multiple task functions (such as collecting data at an entrance, printing a report and/or sorting data) without requiring a central processor that is adapted to provide these multiple task functions.

Although this invention has been described in connection with a classroom embodiment, it can readily be seen that the basic invention can be adapted to a number of institutional contexts. For example, this system can be used in a hospital to provide regular check in of various personnel on various wards and can couple the check in with a keyboard 28 input that can provide patient information and/or supply information.

What I claim is:

1. An identification system comprising:
   a plurality of identification cards available for use by a plurality of individuals;
   multiple terminals, each of said terminals operating as a stand-alone entity independent of each of the other of said terminals;
   a plurality of readable record means, each of said record means adapted to be coupled to any one of said terminals, each of said record means being readily removable from the terminal to which it is coupled and portable between terminals;
   each of said terminals including means to read identification data from any one of said identification cards presented at the terminal involved, and means to record said identification data on the record means that is coupled to said terminal.

2. The identification system of claim 1 wherein each of said terminals further comprises:
   means to read predetermined associated data in real-time at the time of each such presentation of an identification card, said means to record associating said predetermined data on the record means with said identification data.

3. The identification system of claim 1 wherein said readable record means is a tape cassette.

4. The identification system of claim 2 wherein said readable record means is a tape cassette.

5. The identification system of claim 1 wherein said predetermined associated data is real-time.

6. The identification system of claim 2 wherein said predetermined associated data is real-time.

7. The identification system of claim 4 wherein said predetermined associated data is real-time.

8. The identification system of claim 5 further comprising:
   time display means to provide a display of real-time data to the individual presenting the identification card to said terminal for reading.

9. The identification system of claim 7 further comprising:
   time display means to provide a display of real-time data to the individual presenting the identification card to said terminal for reading.

10. The identification system of claim 2 further comprising:
    a keyboard to provide additional input data as at least part of said associated data.

11. The identification system of claim 4 further comprising:
    a keyboard to provide additional input data as at least of said associated data.

12. The identification system of claim 7 further comprising:
    a keyboard to provide additional input data as at least part of said associated data.

13. The identification system of claim 1 further comprising:
    a central processing unit adapted to read data from said readable record means when said record means is removed from any of said terminals and is presented to said central processing unit, the processing of data at said data processing unit being timed independent of the prcessing of data at any of said multiple terminals.

14. The identification system of claim 2 further comprising:
    a central processing unit adapted to read data from said readable record means when said record means is removed from any of said terminals and is presented to said central processing unit, the processing of data at said data processing unit being timed independent of the processing of data at any of said multiple terminals.

15. The identification system of claim 4 further comprising:
    a central processing unit adapted to read data from said readable record means when said record means is removed from any of said terminals and is presented to said central processing unit, the processing of data at said data processing unit being timed independent of the processing of data at any of said multiple terminals.

16. The identification system of claim 5 further comprising:
    a central processing unit adapted to read data from said readable record means when said record means is removed from any of said terminals and is presented to said central processing unit, the processing of data at said data processing unit being timed independent of the processing of data at any of said multiple terminals.

17. The identification system of claim 6 further comprising:
    a central processing unit adapted to read data from said readable record means when said record means is removed from any of said terminals and is presented to said central processing unit, the processing of data at said data processing unit being timed independent of the processing of data at any of said multiple terminals.

18. The identification system of claim 7 further comprising:
    a central processing unit adapted to read data from said readable record means when said record means is removed from any of said terminals and is presented to said central processing unit, the processing of data at said data processing unit being timed independent of the processing of data at any of said multiple terminals.

* * * * *